United States Patent
Morati et al.

(10) Patent No.: US 10,903,643 B2
(45) Date of Patent: Jan. 26, 2021

(54) SEMICONDUCTOR CURRENT CUTOFF DEVICE INCLUDING A SEMICONDUCTOR SWITCH AND A MECHANICAL SWITCH

(71) Applicant: MERSEN France SB SAS, Saint-Bonnet-de-Mure (FR)

(72) Inventors: Mathieu Morati, Dolomieu (FR); François Anne, Angers (FR); Jean-François De Palma, Barthelemy d'Anjou (FR); Thibaut Chailloux, Villeurbanne (FR)

(73) Assignee: MERSEN FRANCE SB SAS, Saint-Bonnet-de-Mure (FR)

( * ) Notice: Subject to any disclaimer, the term of this patent is extended or adjusted under 35 U.S.C. 154(b) by 170 days.

(21) Appl. No.: 16/312,297

(22) PCT Filed: Jun. 29, 2017

(86) PCT No.: PCT/EP2017/066092
§ 371 (c)(1),
(2) Date: Dec. 21, 2018

(87) PCT Pub. No.: WO2018/002198
PCT Pub. Date: Jan. 4, 2018

(65) Prior Publication Data
US 2019/0237960 A1    Aug. 1, 2019

(30) Foreign Application Priority Data

Jun. 30, 2016    (FR) ...................................... 16 56181

(51) Int. Cl.
*H02H 3/05*    (2006.01)
*H01H 47/00*    (2006.01)
(Continued)

(52) U.S. Cl.
CPC .............. *H02H 3/05* (2013.01); *H01H 9/542* (2013.01); *H01H 47/001* (2013.01); *H02H 3/08* (2013.01); *H02H 3/083* (2013.01)

(58) Field of Classification Search
CPC ....... H01H 2009/543; H01H 2009/544; H01H 2009/546; H01H 2033/66215;
(Continued)

(56) References Cited

U.S. PATENT DOCUMENTS 4,897,754 A  *  1/1990  Konishi ................. H01H 9/167
                                                        361/1
5,650,901 A     7/1997  Yamamoto
(Continued)

FOREIGN PATENT DOCUMENTS

EP       0974993 A2     1/2000
EP       2801994 A1    11/2014
WO    20110116832 A1    9/2011

OTHER PUBLICATIONS

INPI Rapport de Recherche Préliminaire for French Patent Application No. 1656181, Mar. 14, 2017, 2 pp.
(Continued)

*Primary Examiner* — Jared Fureman
*Assistant Examiner* — Nicolas Bellido
(74) *Attorney, Agent, or Firm* — Soquel Group LLC (57) ABSTRACT

A semiconductor current cutoff device, including a circuit having a first branch including an energy absorbing member and a second branch including a semiconductor switch, the semiconductor switch being connected in parallel with the first branch, a current measuring means for measuring the intensity of the electrical current at a connection terminal of the device, and an electronic control unit for controlling the semiconductor switch, programmed to control the opening of the semiconductor switch when the current intensity (Continued)

measured by the current measurement means reaches a predetermined value, the device then switching from a conductive state to a cutoff state, the circuit including a third branch including a mechanical switch, and the electrical control unit being programmed so that the semiconductor switch is closed before the mechanical switch.

10 Claims, 9 Drawing Sheets

(51) Int. Cl.
*H01H 9/54* (2006.01)
*H02H 3/08* (2006.01)

(58) Field of Classification Search
CPC ..... H01H 2033/66223; H01H 2235/01; H01H 3/222; H01H 33/04; H01H 33/125; H01H 33/14; H01H 33/167; H01H 33/59; H01H 33/596; H01H 33/66207; H01H 33/66238; H01H 33/664; H01H 33/6647; H01H 33/666; H01H 47/001; H01H 89/00; H01H 9/30; H01H 9/54; H01H 9/542; H01H 9/547; H01H 9/548; H02H 1/0007; H02H 1/0092; H02H 3/02; H02H 3/021; H02H 3/023; H02H 3/025; H02H 3/033; H02H 3/05; H02H 3/08; H02H 3/083; H02H 3/087; H02H 3/105; H02H 9/02; Y10T 307/747

See application file for complete search history.

(56) References Cited

U.S. PATENT DOCUMENTS

| | | | | |
|---|---|---|---|---|
| 5,933,310 | A * | 8/1999 | Eggendorfer | H02H 9/042 337/76 |
| 7,902,811 | B2 * | 3/2011 | Shoji | G01R 15/205 324/117 R |
| 8,686,814 | B2 * | 4/2014 | Bach | H01H 3/222 335/16 |
| 8,717,716 | B2 * | 5/2014 | Hafner | H01H 9/548 361/8 |
| 10,116,132 | B2 * | 10/2018 | Lee | H01H 33/596 |
| 2009/0039880 | A1 * | 2/2009 | Nomura | G01R 15/202 324/252 |
| 2012/0087049 | A1 | 4/2012 | Komatsu et al. | |
| 2012/0299393 | A1 * | 11/2012 | Hafner | H01H 9/542 307/113 |
| 2013/0278078 | A1 * | 10/2013 | Ohlsson | H02H 3/02 307/113 |

OTHER PUBLICATIONS

International Search Report for Patent Application No. PCT/EP2017/066092, dated Sep. 6, 2017, 3 pp.
English machine translation of Chinese Patent 200983494 Y.
English machine translation of Chinese Patent 103647248 B.
English machine translation of Chinese Publication 105609364 A.
Canadian Patent 2780946 C (corresponds to Chinese Patent 102687221 B).
European Patent 2801994 B1 (corresponds to Chinese Patent 104143809 B).

* cited by examiner

SEMICONDUCTOR CURRENT CUTOFF DEVICE INCLUDING A SEMICONDUCTOR SWITCH AND A MECHANICAL SWITCH

CROSS-REFERENCE TO RELATED APPLICATIONS

This application claims benefit under 35 USC § 371 of PCT Application No. PCT/EP2017/066092 entitled SEMICONDUCTOR CUTOFF DEVICE, filed on Jun. 29, 2017 by inventors Mathieu Morati, François Anne, Jean-François De Palma and Thibaut Chailloux. PCT Application No. PCT/EP2017/066092 claims priority of French Patent Application No. 16 56181, filed on Jun. 30, 2016.

FIELD OF THE INVENTION

The present invention relates to a semiconductor current cutoff device.

BACKGROUND OF THE INVENTION

As described in EP-A-0,513,346, a semiconductor cutoff device comprises two electrical connection terminals, among which a first terminal is connected to a generator and a second terminal is connected to an electrical component, which is called the charge. The device comprises a circuit including two branches connected in parallel: a first branch includes a semiconductor switch and a second branch includes an energy absorber, such as a varistor. The device also comprises means for measuring the intensity of the current at one terminal of the device and an electronic control unit of the switch. Under normal operating conditions, the switch is closed and provides the connection between the generator and the charge. When an overcurrent is detected, the switch opens and the electrical energy is dissipated inside the energy absorber.

By definition, a semiconductor switch is a relatively poor conductor, sometimes with a high intensity. One drawback of this type of device is therefore that the quantity of energy dissipated by the switch when it is closed is relatively high. The intensity of the current supplied to the charge is therefore, in proportion, fairly low. Thus, in practice, this device is not used in the industry.

One obvious solution to this problem consists of replacing the semiconductor switch with a mechanical switch, for example an electromechanical relay. In this type of application, an electromagnetic relay comprises a pair of fixed contacts and a pair of moving contacts. During closing, the moving contacts inevitably "rebound" against the moving contacts during a certain transitional period. This is referred to as a rebound phenomenon, which is more or less pronounced depending on the type of application. During this transitional period, the contact is not clearly established and electric arcs may appear between the moving contacts and the fixed contacts of the switch, in particular when the intensity of the current is very strong. These electric arcs will damage the contact surfaces of the switch. The temperature of the metals may even climb, under the effect of the heat given off by the electric arc, up to the melting point, such that the contacts become bonded to one another, in a manner comparable to the effect obtained with an arc welding method.

SUMMARY OF THE DESCRIPTION

The invention more particularly aims to resolve these drawbacks by proposing a semiconductor cutoff device that is more robust and that offers a better electrical connection in the on state.

To that end, the invention relates to a semiconductor current cutoff device, comprising:
- a circuit with a first branch having an energy absorbing member and a second branch having a semiconductor switch, the semiconductor switch being connected in parallel with the first branch, the circuit comprising a third branch having a mechanical switch, the third branch being connected in parallel with the second branch,
- a means for measuring the intensity of the electrical current at a terminal of the device, and
- an electronic control unit of the switch, programmed to control the opening of the semiconductor switch when the intensity of the current measured by the measuring means reaches a predetermined value, the device then switching from a conductive state to a cut-off state, in which the current is absorbed by the energy absorbing member, the opening and closing of the mechanical switch being controlled by the electronic control unit, the electronic control unit being programmed such that the semiconductor switch is opened after the mechanical switch when the device switches from the conductive state to the cut-off state.

According to the invention, the electronic control unit is programmed such that the semiconductor switch is closed before the mechanical switch when the device switches from the cut-off state to the conductive state.

Owing to the invention, the electrical current passes through the semiconductor switch while the electrical current of the mechanical switch is not clearly established, and therefore in particular during the transitional rebound period. The voltage across the terminals of the mechanical switch is therefore very weak, or even nil, during the transitional rebound period. There is therefore no risk of an electric arc appearing between the contacts of the mechanical switch.

Furthermore, when there is a need for a current cutoff, the semiconductor switch remains closed during a certain period after the end of the opening sequence of the mechanical switch. This makes it possible to obtain a deionization of the air between the fixed contacts and the moving contacts of the mechanical switch. This sequencing upon opening is in particular known from EP 2,801,994 A1 and U.S. Pat. No. 5,650,901.

In fact, EP 2,801,994 A1 discloses a semiconductor current cutoff device in which the switch is opened after the mechanical switch, so as to prevent the formation of an electric arc between the fixed and moving contacts of the mechanical switch.

U.S. Pat. No. 5,650,901 in turn discloses a cutoff circuit for a three-phase distribution system. The circuit comprises, for each phase, a cutoff device according to the preamble of claim 1. When a fault appears in the distribution system, in particular at a phase, the mechanical switch of the corresponding cutoff device is opened and the semiconductor switch remains closed, at least during a certain period of time.

Conversely, neither of these two documents addresses the issue of the opening sequence, and in particular the management of the transitional rebound period during which the electrical contact within the mechanical switch is not completely established. It is therefore likely that an electric arc, capable of damaging the mechanical switch, forms upon each closing sequence of the device. These known devices are therefore clearly less robust over time, since they are more sensitive to the repetition of opening and closing sequences.

According to advantageous, but optional aspects of the invention, the cutoff device may incorporate one or more of the following features, considered in any technically allowable combination:

The mechanical switch comprises a fixed part, a part moving between an open position and a closed position and a means for measuring the position of the moving part relative to the fixed part, said measuring means being connected to the electronic control unit, while the electronic control unit is programmed to close the semiconductor switch when the moving part, moving toward the closed position, reaches a first threshold position. Thus, the semiconductor switch is closed as late as possible before beginning the transitional period, so as to prevent the switch from bearing the passage of the current for too long and therefore becoming damaged too quickly. The closing time of a semiconductor switch is very short compared to the closing time of a mechanical switch. For example, the closing time of a semiconductor switch is about 1 μs (microsecond), while the closing time of a "traditional" mechanical switch is between 5 and 25 ms (milliseconds). In practice, the semiconductor switch is closed before the moving contacts come to close to the fixed contacts, i.e., before the risk of an electric arc appearing becomes too great. The semiconductor switch is therefore closed when the distance between the contacts is below a threshold value. The distance is calculated dynamically by the electronic control unit owing to the position measurement provided by the measuring means.

The first threshold position is defined such that a first period between the closing of the switch and the closing of the mechanical switch is between 100 μs and 1 ms.

The electronic control unit is programmed to open the semiconductor switch after a second period from the moment where the moving part moving toward the open position reaches a second threshold position, said second threshold position being defined such that the second period is less than 1 ms, in particular between 10 μs and 100 μs. This advantageously makes it possible to prevent the passage of current through the mechanical switch for the time it takes to deionize the volume of air between the fixed contacts and the moving contacts. One thus avoids "re-arcing" the switch, i.e., creating electric arcs between the moving and fixed contacts.

The energy absorbing member is removable. This makes it possible to replace the energy absorbing member when its operation becomes deteriorated, for example after a certain number of uses, and thus to avoid replacing the entire cutoff device.

The mechanical switch comprises a moving part provided with a repulsion disc and a repulsion coil, which, when supplied with current, repels the repulsion disc, the moving part then moving from its closed position to its open position. This makes it possible to obtain rapid opening of the mechanical switch. For example, the opening time of such a switch is about 200 μs, while the opening time of a "traditional" mechanical switch is between 5 and 25 ms. Thus, when an overcurrent is detected, the device is opened as quickly as possible so that the charge is conducted for as little time as possible under the effect of a fault current.

The mechanical switch has an opening time shorter than 1 ms, in particular around 200 μs.

The circuit comprises a fourth branch having a node shared with the third branch and a node shared with the first two branches, this fourth branch comprising another mechanical switch.

The circuit comprises a fourth branch connecting an electrical connection terminal of the device to the first three branches of the circuit, this fourth branch comprising another mechanical switch.

The other mechanical switch is dimensioned to provide galvanic insulation between a first connection terminal and a second connection terminal of the device.

The device comprises two electrical connection terminals, one of which is intended to be connected to a DC current source.

BRIEF DESCRIPTION OF THE DRAWINGS

The invention and other advantages thereof will appear more clearly in light of the following description of two embodiments of a semiconductor current cutoff device according to their principle, provided solely as an example and done in reference to the appended drawings, in which.

DETAILED DESCRIPTION

Figure 1:
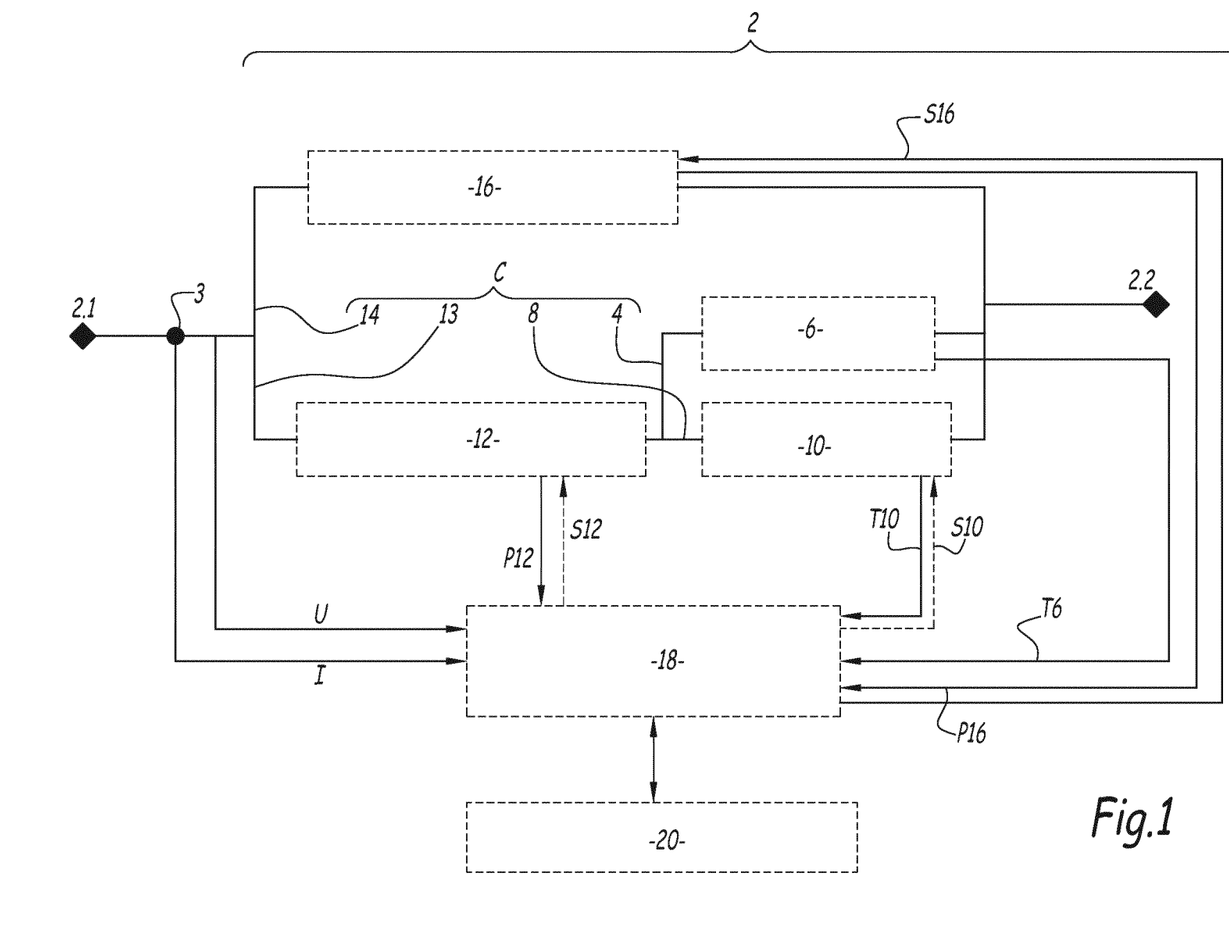
FIG. 1 is an electrical diagram of a cutoff device according to a first embodiment of the invention.

FIG. 1 shows a semiconductor current cutoff device 2. The device 2 is an electrical protection apparatus intended to be inserted into an electrical circuit to be protected. The device 2 comprises two electrical connection terminals, respectively 2.1 and 2.2. The terminal 2.1 can be connected to a current source, while the terminal 2.2 can be connected to an electric charge, or vice versa. It is therefore understood that the cutoff device 2 is a two-way device.

Typically, the current source is a DC current source, i.e., a source whose voltage is independent of time.

The cutoff device 2 comprises an electric circuit C with a first branch 4 having an energy absorbing member 6. This energy absorbing member 6 comprises one or more of the following elements, which may be associated in series and/or in parallel:

one or several varistors associated in series and/or in parallel, one or several Zener/Transil diodes associated in series and/or in parallel, one or several gas tubes associated in series and/or in parallel, one or several resistances associated in series and/or in parallel, and one or several capacitors associated in series and/or in parallel.

The circuit C also comprises a second branch 8 having a semiconductor switch 10 connected in parallel with the first branch 4 of the circuit C. The switch 10 comprises one or several of the following electronic components, which may be associated in series and/or in parallel:

one or several thyristors, in particular of the gate turn-off (GTO) type, one or several diodes, and one or several transistors, in particular of the metal-oxide semiconductor field-effect transistor (MOSFET) type.

The circuit C comprises a third branch 14 including a mechanical switch 16. This third branch 14 is connected in parallel with the second branch 8 and with the first branch 4.

Advantageously, the circuit C comprises a fourth branch 13 having a node shared with the third branch 14 and a node shared with the branches 4 and 8. This fourth branch 13 connects the terminal 2.1 of the device 2 to the branches 4 and 8 of the circuit C. It comprises another mechanical switch 12 connected in series with the semiconductor switch 10 and with the energy absorbing member 6.

The mechanical switch 12 is dimensioned to provide galvanic insulation between the connection terminals 2.1 and 2.2 of the device 2. Indeed, the mechanical switch 12 imposes a physical distance between the connection terminals 2.1 and 2.2 that is greater than 1.5 mm, preferably around 3 mm. The switch 12 is optional for carrying out the invention.

Figure 2:
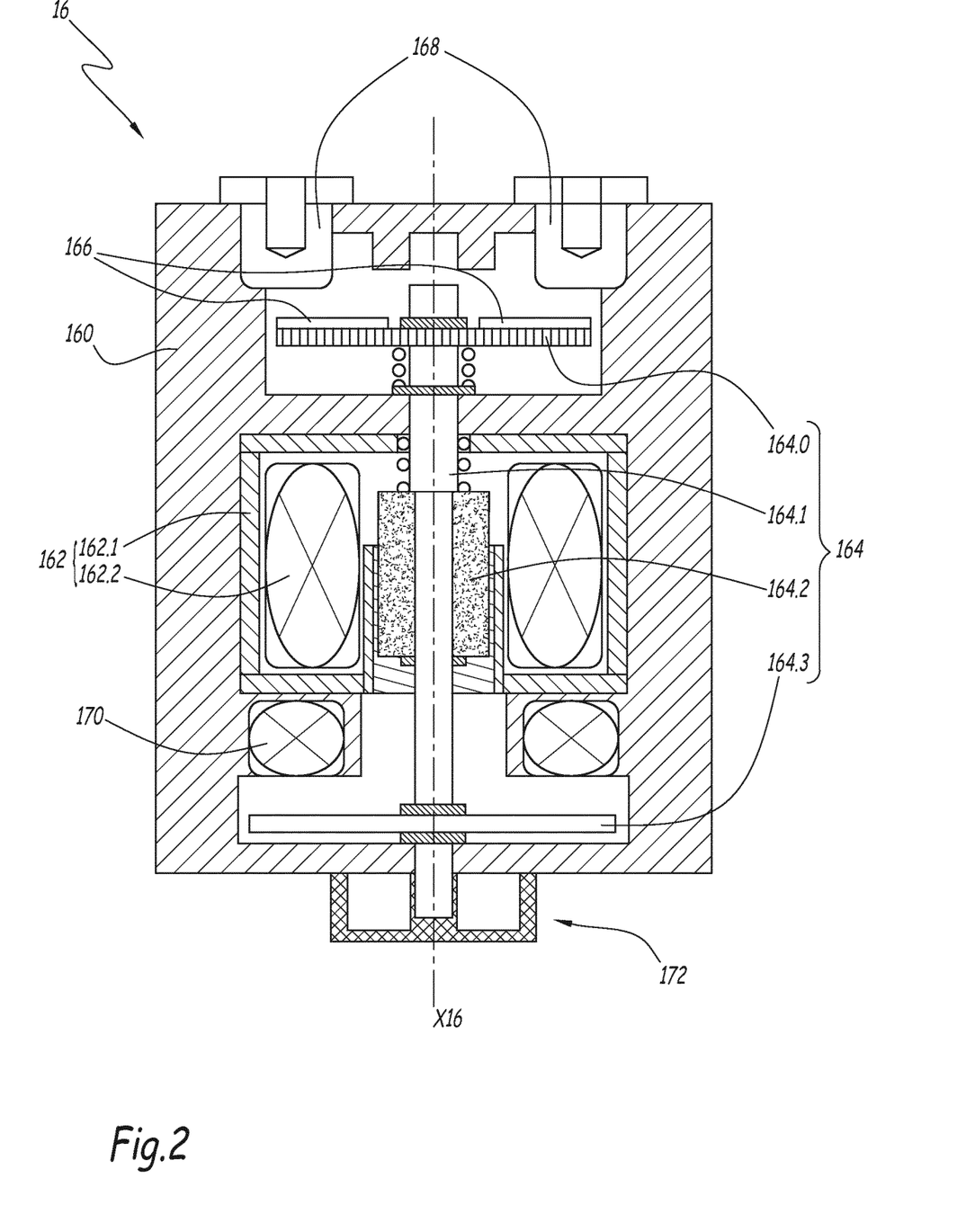
FIG. 2 is a sectional view showing a mechanical switch belonging to the cutoff device of FIG. 1, said mechanical switch being shown in the open position.
Figure 3:
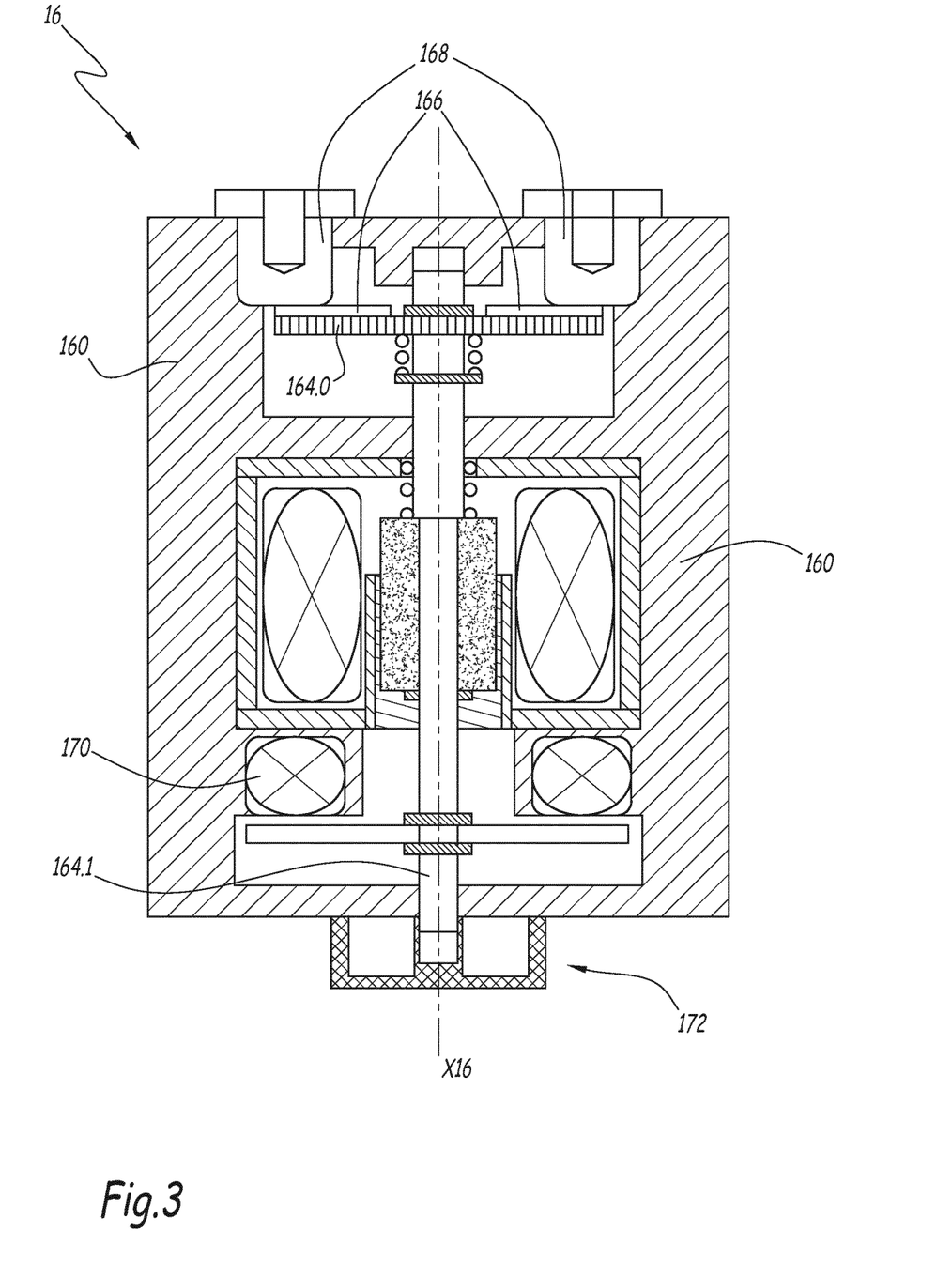
FIG. 3 is a sectional view comparable to FIG. 2, in which the mechanical switch is shown in the closed position.

The structure of the mechanical switch 16 is visible in FIGS. 2 and 3. As shown in these figures, the mechanical switch 16 comprises a frame 160, a pair of fixed contacts 168 and a pair of moving contacts 166. The moving contacts 166 are mounted on a contact holder 164.0 made from an electrically insulating material.

The mechanical switch 16 comprises an electromagnetic actuator housed inside the frame 160. The actuator comprises a fixed part 162 including a cage 162.1, inside which a coil 162.2 is arranged capable of generating a magnetic field, as well as a part 164, movable along an axis X16, between an open position shown in FIG. 2 and a closed position shown in FIG. 3. This moving part 164 comprises the contact holder 164.0, a central shaft 164.1, a magnetic core 164.2 fastened around a central part of the shaft 164.1 and a repulsion disc 164.3. The contact holder 164.0 and the repulsion disc 164.3 are fastened at opposite ends of the shaft 164.1.

The frame 160 also houses a repulsion coil 170, which, when supplied with DC current, repels the repulsion disc 164.3, which results in moving the moving part 164 of the actuator from the closed position to the open position.

When the mechanical switch 16 receives a closing control signal, the coil 162.2 is supplied with DC current and generates a magnetic field oriented to move the magnetic core 164.2 of the moving part 164. The moving part 164 then moves from the position of FIG. 2 to the position of FIG. 3, in which the moving contacts 166 touch the fixed contacts 168. The electrical contacts of the switch 16 are therefore normally open when there is no electrical supply of the coil 162.2. This is called NO contact topology.

The mechanical switch 16 comprises a means 172 for measuring the position P16 of the moving part 164 relative to the fixed part 162. In the example, the measuring means 172 is a photoelectric sensor.

When the mechanical switch 16 receives an opening control signal, the repulsion coil 170 is supplied with current and generates a magnetic field oriented to repel the repulsion disc 164.3 along a direction opposite the fixed contacts 168 of the switch 16. The use of magnetic repulsion to open the switch 16 procures an extremely quick opening time compared with a "traditional" electromechanical actuator in which the return of the moving part to the open position is done by a mechanical element, such as a spring. In practice, the opening time, measured from the moment where the opening order is sent and the moment where the electrical contact is actually opened, is much shorter than 1 ms.

The cutoff device 2 also comprises an electronic control unit 18 that is connected with each of the components of the electronic circuit C. Thus, the electronic control unit 18 is capable of sending control signals to open and close the switches 12 and 16, as well as to open and close the switch 10. These control signals are respectively referenced S12, S16 and S10 in FIG. 1. In the example, the signals S12, S16 and S10 assume the value "1" when the corresponding mechanical or semiconductor switch is closed and the value "0" corresponding mechanical or semiconductor switch is open.

The electronic control unit 18 is connected to the mechanical switch 16, and in particular to the measuring means 172, to dynamically collect the position P16 of the moving part 164 of the actuator relative to the fixed part 162.

The electronic control unit 18 is also connected to the energy absorbing member 6 and to the semiconductor switch 10 to dynamically recover the temperature T6 of the member 6 and the temperature T10 of the semiconductor switch 10. This makes it possible to monitor the operating state of the energy absorbing member 6 and the semiconductor switch 10, by detecting any overheating.

Furthermore, the electronic control unit 18 is connected to the other mechanical switch 12 to collect the state P12 of the switch 12. The state P12 of the switch 12 is for example sent in the form of a binary signal, which is equal to "0" when the switch 12 is open and "1" when the switch 12 is closed.

The device 2 comprises a means 3 for measuring the intensity I at the input of the device 2, i.e., at the connection terminal 2.1. The measuring means 3 is an ammeter that continuously sends the electronic control unit 18 an electrical signal representative of the measured intensity I. Alternatively, the intensity can be measured at the terminal 2.2. Advantageously, the device 2 further comprises a voltmeter to measure the voltage, i.e., the electric potential, at the input of the device 2.

The cutoff device 2 can assume two states: a conductive state, in which the current circulates between the two electrical connection terminals 2.1 and 2.2, and a cut-off state, in which the electrical current is absorbed by the energy absorbing member 6 and in which no current circulates between the electrical connection terminals 2.1 and 2.2. When the intensity I of the current measured by the measuring means 3 reaches a predetermined value, the device switches from the conductive state to the cut-off state.

Advantageously, the device 2 comprises a user interface 20 making it possible to communicate the state of the device 2 to an outside person, such as an operator. The user interface 20 may comprise any type of visual communication means, such as light-emitting diodes (LED) or a screen. The screen may be touch-sensitive. The user interface 20 may also comprise touch-sensitive communication means, such as control buttons.

In the present document and unless otherwise indicated, the terms "open" and "closed" used in connection with the mechanical switches 12 and 16 or in relation with the semiconductor switch 10 correspond to the state of the mechanical or semiconductor switch in question, and not the opening or closing action.

Figure 4:
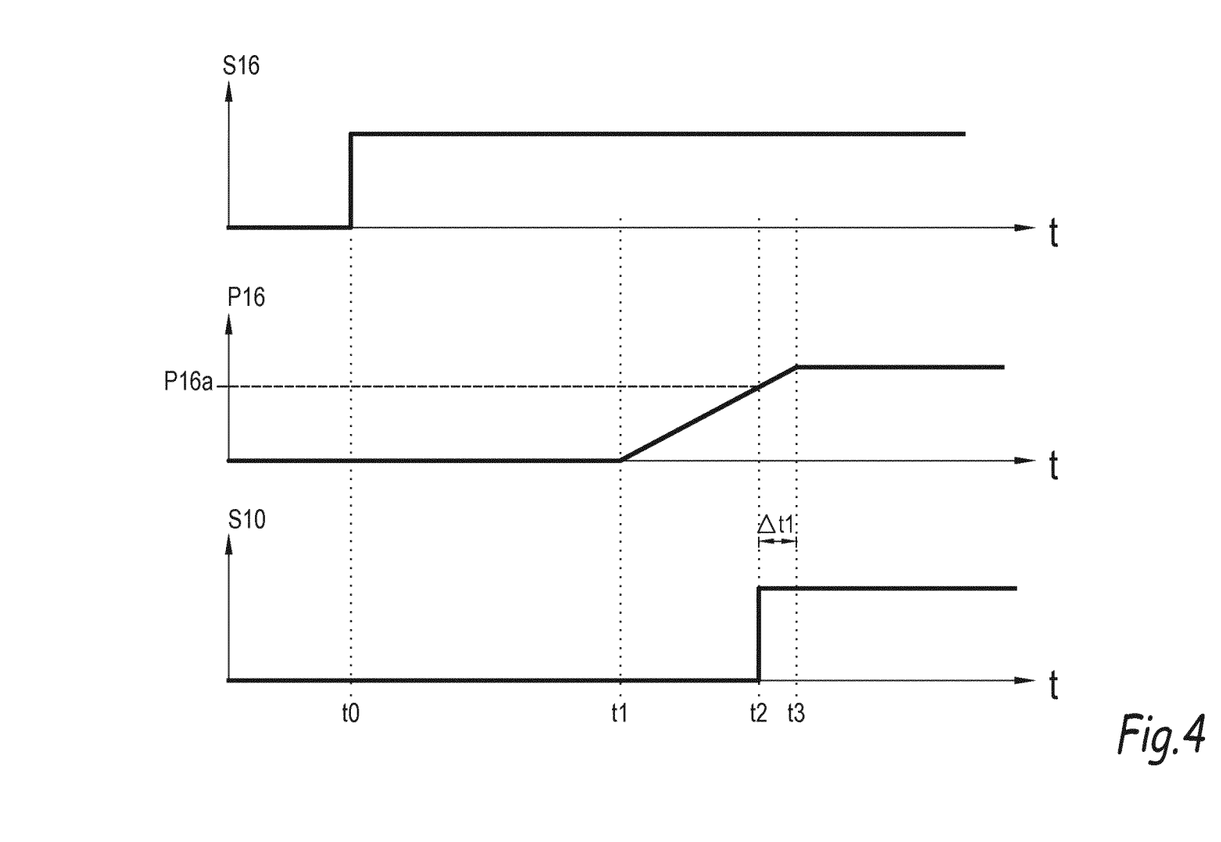
FIG. 4 comprises three graphs representative of the evolution, as a function of time, of a control signal S16 of the mechanical switch of FIGS. 2 and 3, the position P16 of a moving part of the mechanical switch of FIGS. 2 and 3 relative to a fixed part and a control signal S10 of a semiconductor switch belonging to the cutoff device of FIG. 1, during a closing sequence of the cutoff device.

The closing sequence of the cutoff device 2 is described in detail below in connection with FIGS. 4 and 5.

At a moment t0, the control signal S16 of the mechanical switch 16 assumes the value "1", which means that the closing of the mechanical switch 16 is requested. At a later moment t1, the moving part 164 of the electromagnetic actuator of the switch 16 begins to move along the axis X16. The time gap between the moments t0 and t1 corresponds to the reaction time of the switch 16.

At a later moment t2, the moving part 164, then moving toward the closed position, reaches a threshold position P16a. At this moment t2, a control signal S10 of the semiconductor switch 10 enters state "1", which means that the closing of the semiconductor switch 10 is requested. The closing time of the semiconductor switch 10 is extremely fast relative to that of the mechanical switch 16. Thus, in the present example, the semiconductor switch 10 is considered to be closed at moment t2.

At a later moment t3, the mechanical switch 16 is completely closed, i.e., the moving contacts 166 are bearing against the fixed contacts 168.

The electronic control unit 18 is therefore programmed such that the semiconductor switch 10 is closed before the mechanical switch 16 when the device 2 switches from the cut-off state to the conductive state. This means that the semiconductor switch 10 switches to the cut-off state before the mechanical switch 16.

The threshold position P16a is defined such that the period Δt1 elapsing between the closing of the semiconductor switch 10 and the closing of the mechanical switch 16, i.e., the period elapsing between the moments t2 and t3, is between 100 μs and 1 ms.

Figure 5:
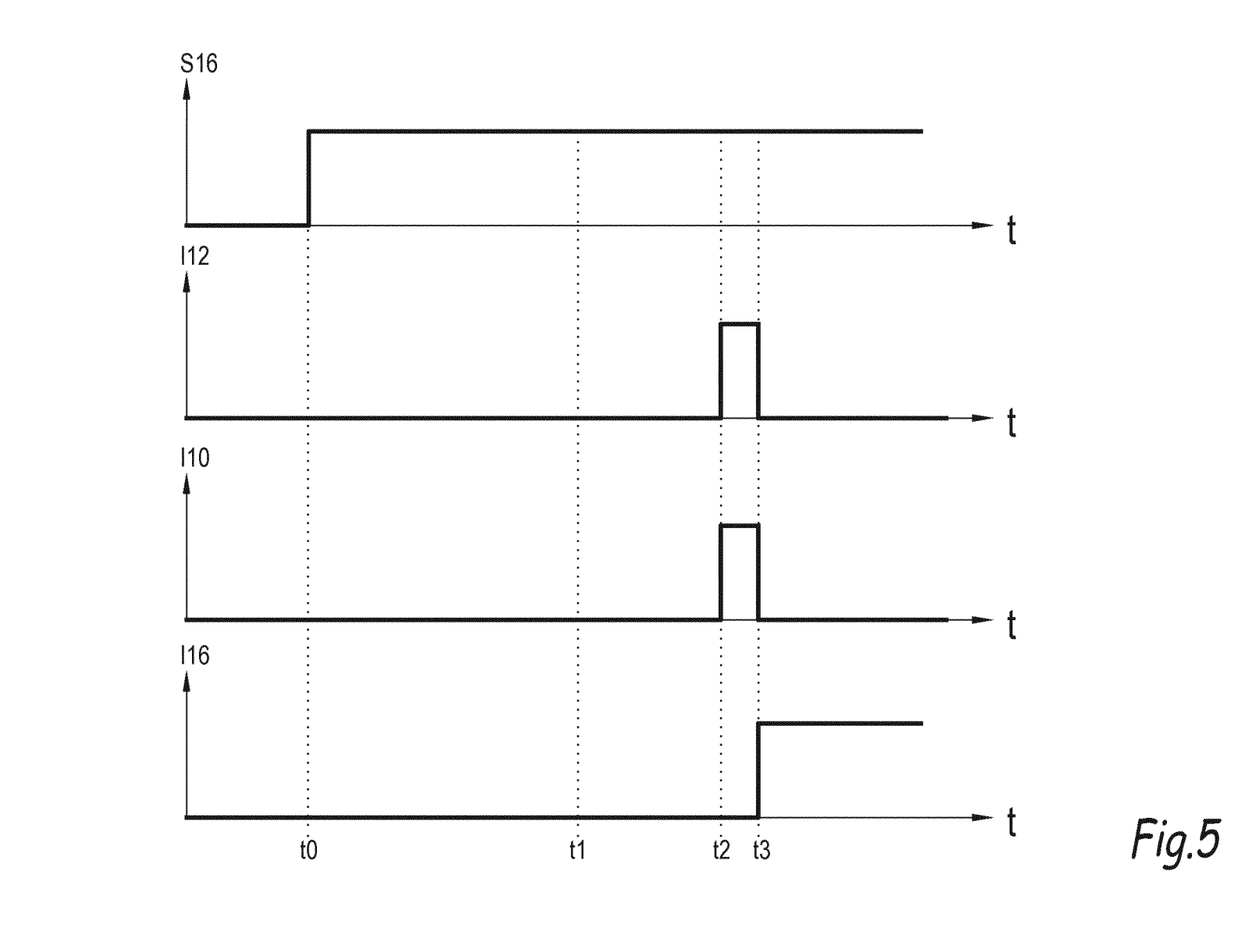
FIG. 5 comprises four graphs representative of the evolution, as a function of time, of the control signal S16 of the mechanical switch of FIGS. 2 and 3, the intensity 112 traversing another mechanical switch belonging to the cutoff device of FIG. 1, the intensity 110 traversing a semiconductor switch of the device and the intensity 116 of the current traversing the mechanical switch of FIGS. 2 and 3, during the closing sequence of the device.

As shown in FIG. 5, until the moment t2, no current circulates through the cutoff device 2. The period Δt1 corresponds to, or at least includes, the transitional closing period of the mechanical switch 16. This transitional period is marked by a characteristic rebound phenomenon, following which the moving contacts 166 rebound against the fixed contacts 168.

The application of a high voltage across the terminals of the mechanical switch during this transitional period can be detrimental to the operation of the switch, since electric arcs may occur between the pairs of contacts. These electric arcs may damage the contact surfaces, or even create weld spots between the fixed contacts and the moving contacts. Yet between the moments t2 and t3, the current at the input of the cutoff device 2 passes all the way through the mechanical switch 12 and the semiconductor switch 10. Indeed, the resistance of the volume of air between the fixed contacts 168 and the moving contacts 166.1 is greater than the resistance of the switch 10: the current therefore prefers to pass through the branch 8 of the circuit C, rather than through the branch 14. Thus, there is little or no voltage applied across the terminals of the mechanical switch 16 between the moments t2 and t3. The "rebound" transitional period can therefore be done with no risk of electric arc formation.

At moment t3, the mechanical switch 16 is completely closed. Nearly all of the current at the input of the cutoff device 2 then passes through the mechanical switch 16, which has the advantage of having a quasi-nil resistance to the passage of the electrical current. One can then see that the semiconductor switch 10 only conducts the current during a transitional period corresponding to the difference between the moments t3 and t2. The semiconductor switch 10 therefore does not operate in a prolonged manner, as taught in EP-A-0,513,346, such that the thermal energy dissipated through the latter is relatively weak.

Figure 6:
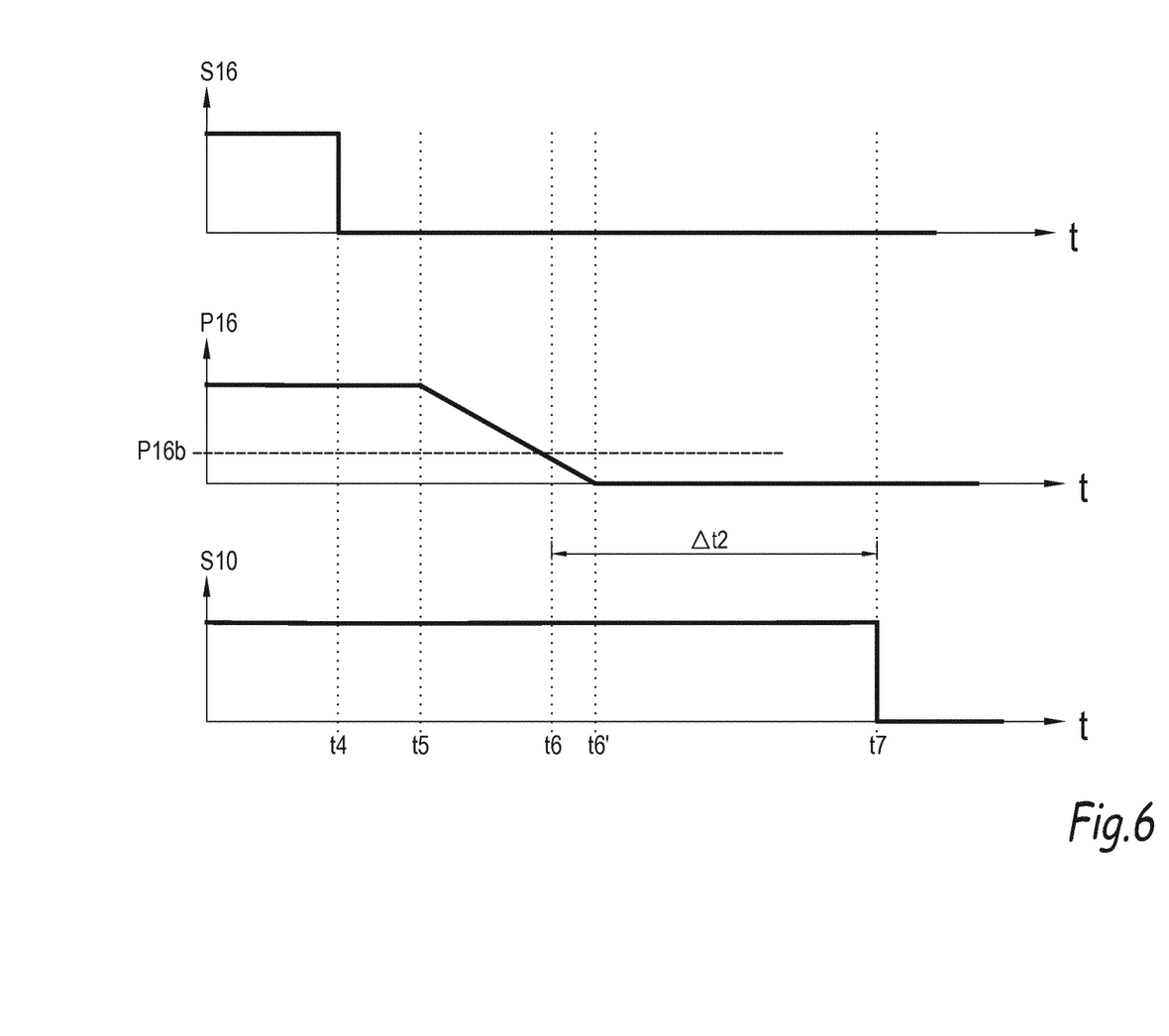
FIG. 6 comprises three graphs showing the same properties as in FIG. 4, but during an opening sequence of the cutoff device of FIG. 1.
Figure 7:
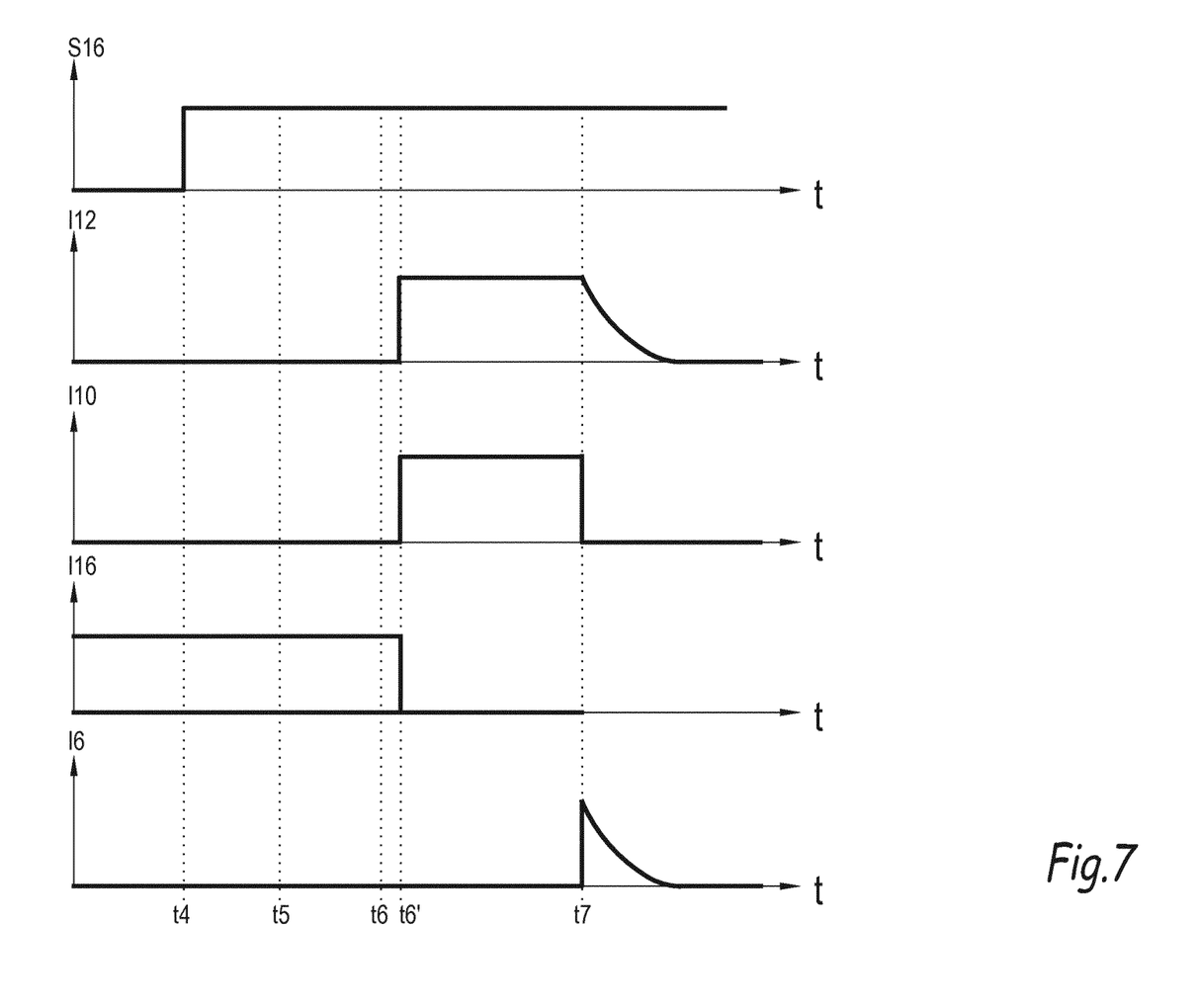
FIG. 7 comprises five graphs showing, as a function of time, the same properties as in FIG. 5, but for an opening sequence of the cutoff device, additionally with a graph showing the intensity 16 traversing an energy absorbing member of the cutoff device of FIG. 1.

The opening sequence of the cutoff device 2 is described below in connection with FIGS. 6 and 7. The opening of the cutoff device 2 is commanded automatically by the electronic control unit 18 when the intensity I at the electrical connection terminal 2.1 reaches a dangerous threshold for the electrical circuit inside which the cutoff device 2 is installed. For example, the electronic control unit 18 can be programmed to dynamically compare the intensity I with a predefined threshold value.

Let us assume in the example that at a moment t4, the intensity I exceeds the threshold value. The electronic control unit 18 then commands the opening of the device 2. The control signal S16 of the switch 16 switches from the state "1" to the state "0", which means that the opening of the mechanical switch 16 is requested.

At a later moment t5, the moving part 164 of the electromagnetic actuator of the switch 16 begins to move from its closed position to its open position. At a later moment t6, the moving part 164, then moving toward the open position, reaches a second threshold position P16b.

At a later moment t6', the mechanical switch 16 is completely open. The current then passes all the way through the mechanical switch 12 and the semiconductor switch 10, which both remain conductive when the cutoff device 2 is in the conductive state, even if no current circulates through them. Indeed, the switch 10 has a relatively high electrical resistance with respect to the switch 16.

At a later moment t7, the semiconductor switch 10 is open. All of the current then enters the first branch 4 having the energy absorber 6. As shown in the diagram at the bottom of FIG. 7, the current is then dissipated inside the energy absorber 6 in the form of thermal energy. In the example where the energy absorbing member 6 is a varistor, the resistance of the member 6 is even greater when the intensity of the current is high. One then obtains a very high voltage across the terminals of the energy absorbing member 6, which results in lowering, and eventually canceling out, the current circulating in the branch 4, and a fortiori the current circulating across the terminals 2.1 and 2.2.

The electronic control unit 18 is therefore programmed to open the semiconductor switch 10 after the mechanical switch 16. This means that the semiconductor switch 10 switches to the conductive state after the mechanical switch 16.

More specifically, the electronic control unit 18 is programmed to open the semiconductor switch 10 after a second period Δt2 from the moment t6 where the moving part 164 moving toward the open position reaches a second threshold position P16b, said second threshold position P16b being defined such that the second period Δt2, defined as the time difference between the moments t6 and t7, is less than 1 ms, in particular between 10 μs and 100 μs. This makes it possible to guide the current toward the branch 8 for the time needed for the volume of air between the fixed contacts 168 and the moving contacts 166.1 to be deionized. One thus avoids "re-arcing" the switch 16, i.e., creating electric arcs between the moving and fixed contacts.

Figure 8:
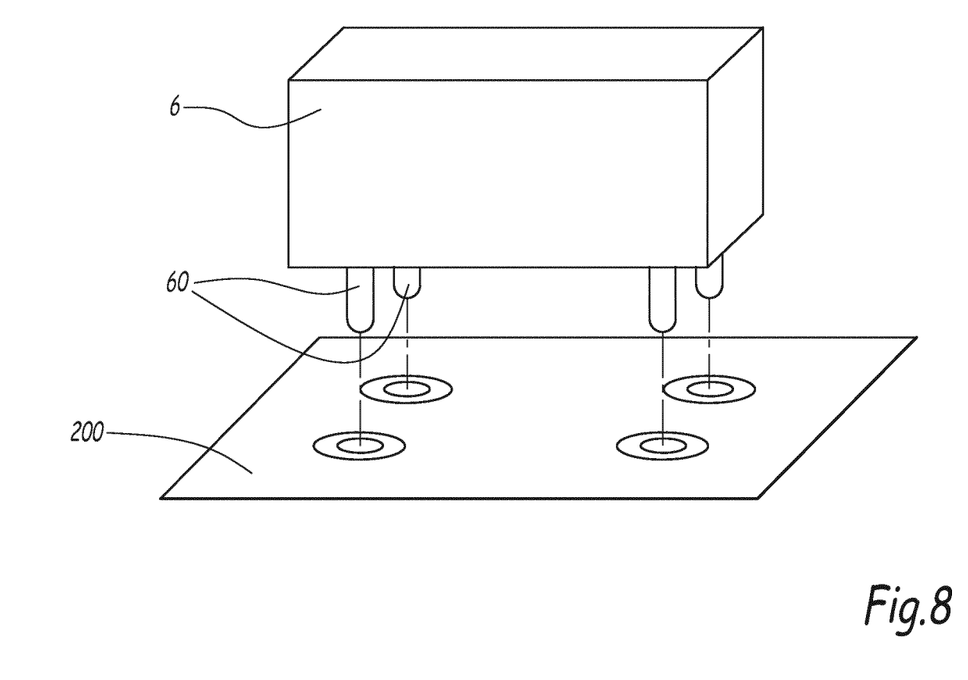
FIG. 8 is a perspective view of the energy absorber, shown in the configuration detached from the cutoff device.

As shown in FIG. 8, the energy absorbing member 6 is preferably removable. It is shown in this figure by a housing provided with four plugs 60 intended to be connected with corresponding power sockets 202 of a support 200 belonging to the cutoff device 2. When it is worn, the energy absorbing member 6 can be replaced by a new member. The wear of the energy absorbing member 6 can be evaluated all throughout the use of the device 2 owing to the temperature measurement T6. Indeed, an abrupt temperature increase of the energy absorber 6 corresponds to a passage of the device to the cut-off state. The unit 18 is then capable of counting and storing, in memory, the number of current cutoffs done by the device 2. Furthermore, the electronic control unit 18 is capable of calculating the energy dissipated by the energy absorber 6 upon each cutoff, via the current measurements I, and capable of detecting an abnormal overheating of the absorber 6. On this basis, an alarm signal can be emitted when the energy absorber 6 should be replaced by a new component.

Figure 9:
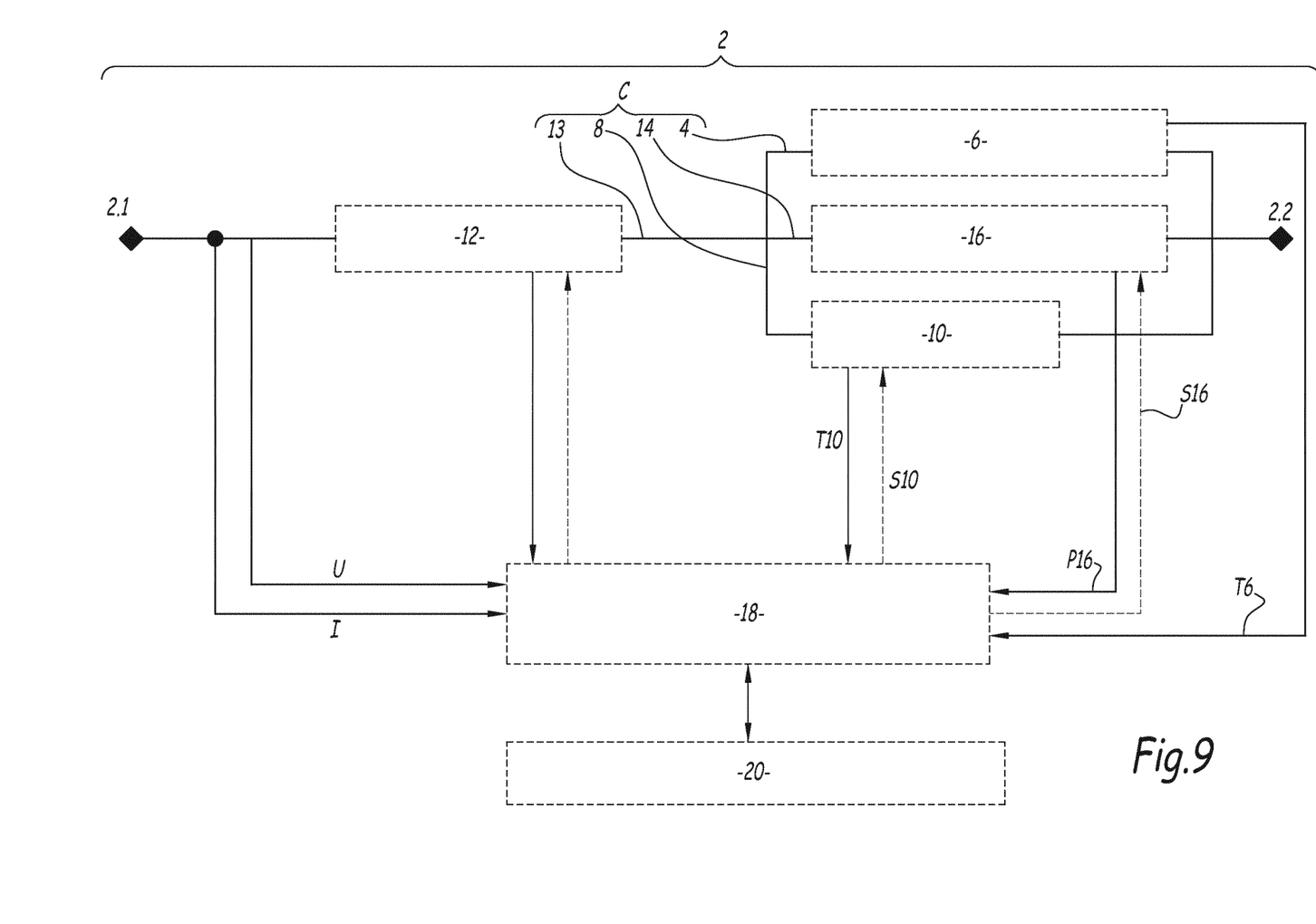
FIG. 9 is a diagram comparable to FIG. 1, showing a semiconductor cutoff device according to a second embodiment of the invention.

FIG. 9 shows a cutoff device according to a second embodiment of the invention. Hereinafter, only the differences with respect to the first embodiment are described in the interest of concision. The electronic components of the cutoff device according to the second embodiment are identical to those used in the cutoff device according to the first embodiment. Thus, the same numerical references are used for both embodiments.

The cutoff device 2 according to this second embodiment differs from that previously described by the fact that the branch 13 comprising the mechanical switch 12 connects the terminal 2.1 to the branches 4, 8 and 14 of the circuit C. The branch 13 therefore has a node shared with each of the branches 4, 8 and 14.

Although the cabling is different, the cutoff device 2 according to this second embodiment differs in a manner comparable to the cutoff device 2 of FIG. 1.

Without regard for the preceding, the removable nature of the energy absorbing member 6 could be brought to the foreground relative to the control of the semiconductor switch 10 and the mechanical switch 12 during the opening and closing of the device 2.

Indeed, in the prior art, when the energy absorbing member, i.e., most often the varistor, was worn, the entire cutoff device was changed, since the energy absorbing member was not provided to be replaced. This was of course very expensive. The idea here is therefore to propose a semiconductor current cutoff device 2 that is able to be maintained more easily, and therefore with an increased lifetime. Two embodiments of such a semiconductor current cutoff device 2 are shown in FIGS. 1 to 9.

This semiconductor current cutoff device 2 still comprises:
  a circuit C with a first branch 4 having an energy absorbing member 6 and a second branch 8 having a semiconductor switch 10, the semiconductor switch 10 being connected in parallel with the first branch 4,
  a means 3 for measuring the intensity of the electrical current at a terminal 2.1 or 2.2 of the device, and
  an electronic control unit 18 of the switch 10, programmed to control the opening of the semiconductor switch 10 when the intensity I of the current measured by the measuring means 3 reaches a predetermined value, the device then switching from a conductive state to a cut-off state, in which the current is absorbed by the energy absorbing member.

In this embodiment, the cutoff device 2 is characterized by the fact that the energy absorbing member 6 is removable.

Advantageously, the energy absorbing member 6 comprises a housing provided with four plugs 60 intended to be connected with corresponding power sockets 202 of a support 200 belonging to the cutoff device 2.

The energy absorbing member 6 wisely comprises connecting means forming a mechanical mistake-proofing system, which prevents connecting just any energy absorbing member to the circuit C. Mechanical connection mistake-proofing systems are known in themselves, which is why the mechanical mistake-proofing system implemented for the connection of the energy absorbing member 6 is not described in more detail.

Preferably, the electronic control unit 18 is capable of collecting, dynamically (i.e., in real-time), the temperature T6 of the member 6 and optionally the temperature T10 of the semiconductor switch 10. This makes it possible to monitor the operating state of the energy absorbing member 6 and potentially also that of the semiconductor switch 10, by detecting any overheating.

When it is worn, the energy absorbing member 6 can be replaced by a new member. The wear of the energy absorbing member 6 can be evaluated all throughout the use of the device 2 owing to the temperature measurement T6. Indeed, an abrupt temperature increase of the energy absorber 6 corresponds to a passage of the device to the cut-off state. The unit 18 is then capable of counting and storing, in memory, the number of current cutoffs done by the device 2. Furthermore, the electronic control unit 18 is capable of calculating the energy dissipated by the energy absorber 6 upon each cutoff, via the current measurements I, and capable of detecting an abnormal overheating of the absorber 6. On this basis, an alarm signal can be emitted when the energy absorber 6 should be replaced by a new component.

Additionally, according to advantageous, but optional aspects, this device may comprise one or more of the following features, considered in any technically allowable combination:
  The circuit C comprises a third branch 14 having a mechanical switch 16, the third branch 14 being connected in parallel with the second branch 8;
  The opening and closing of the mechanical switch 16 are controlled by the electronic control unit 18;
  The electronic control unit 18 is programmed such that the semiconductor switch 10 is closed before the mechanical switch 16 when the device 2 switches from the cut-off state to the conductive state;
  The electronic control unit 18 is programmed such that the semiconductor switch 10 is opened after the mechanical switch 16 when the device 2 switches from the conductive state to the cut-off state;
  The mechanical switch 16 comprises a fixed part 162, a part 164 moving between an open position and a closed position and a means 172 for measuring the position P16 of the moving part 164 relative to the fixed part 162, said measuring means 172 being connected to the electronic control unit 18, while the electronic control unit 18 is programmed to close the semiconductor switch 10 when the moving part 164, moving toward the closed position, reaches a first threshold position P16a;

The first threshold position P16a is defined such that a first period Δt1 between the closing of the switch 10 and the closing of the mechanical switch 16 is between 100 μs and 1 ms;

The electronic control unit is programmed to open the semiconductor switch 10 after a second period Δt2 from the moment where the moving part 164 moving toward the open position reaches a second threshold position, said second threshold position being defined such that the second period Δt2 is less than 1 ms, in particular between 10 μs and 100 μs;

The mechanical switch 16 comprises a moving part 164 provided with a repulsion disc 164.3 and a repulsion coil 170, which, when supplied with current, repels the repulsion disc 164.3, the moving part 164 then moving from its closed position to its open position;

The mechanical switch 16 has an opening time shorter than 1 ms, in particular around 200 μs;

The circuit comprises a fourth branch 13 having a node shared with the third branch 14 and a node shared with the first two branches 4 and 8, this fourth branch 13 comprising another mechanical switch 12.

Alternatively, the circuit C comprises a fourth branch 13 connecting an electrical connection terminal 2.1 or 2.2 of the device 2 to the first three branches of the circuit C, this fourth branch 13 comprising another mechanical switch 12.

This other mechanical switch 12 is dimensioned to provide galvanic insulation between a first connection terminal 2.1 and a second connection terminal 2.2 of the device 2.

The features of the embodiments considered above can be combined to create new embodiments of the invention.

The invention claimed is:

1. A semiconductor current cutoff device, comprising:
    a circuit comprising:
        a mechanical switch, comprising:
            a fixed part;
            a moving part, moving between an open position and a closed position; and
            a position measuring means for measuring the position of said moving part relative to said fixed part;
        a semiconductor switch;
        a first branch comprising an energy absorbing member;
        a second branch comprising said semiconductor switch, said semiconductor switch being connected in parallel with said first branch; and
        a third branch comprising said mechanical switch, the third branch being connected in parallel with said second branch;
    a current measuring means for measuring the intensity of the electrical current at a connection terminal of the semiconductor current cutoff device; and
    an electronic control unit of said semiconductor switch, programmed to control the opening of said semiconductor switch when the intensity of the current measured by said current measuring means reaches a predetermined value, the semiconductor current cutoff device then switching from a conductive state to a cut-off state, in which the current is absorbed by said energy absorbing member, the opening and closing of said mechanical switch being controlled by the electronic control unit, the electronic control unit being programmed such that (i) said semiconductor switch is opened after said mechanical switch when the semiconductor current cutoff device switches from the conductive state to the cut-off state, and (ii) said semiconductor switch is closed before said mechanical switch when said moving part, moving toward the closed position, reaches a first threshold position, and the semiconductor current cutoff device switches from the cut-off state to the conductive state.

2. The device according to claim 1, wherein the first threshold position is defined such that a first period between the closing of said semiconductor switch and the closing of said mechanical switch is between 100 μs and 1 ms.

3. The device according to claim 1, wherein said electronic control unit is programmed to open said semiconductor switch after a second period from the moment where said moving part moving toward the open position reaches a second threshold position, the second threshold position being defined such that the second period is less than 1 ms.

4. The device according to claim 1, wherein said energy absorbing member is removable.

5. The device according to claim 1, wherein said mechanical switch comprises a moving part comprising:
    a repulsion disc; and
    a repulsion coil which, when supplied with current, repels said repulsion disc, the moving part then moving from its closed position to its open position.

6. The device according to claim 1, wherein said mechanical switch has an opening time shorter than 1 ms.

7. The device according to claim 1, wherein said circuit comprises a fourth branch having a node shared with said third branch and a node shared with said first two branches, this fourth branch comprising another mechanical switch.

8. The device according to claim 7, wherein said other mechanical switch is dimensioned to provide galvanic insulation between a first connection terminal and a second connection terminal of the device.

9. The device according to claim 1, wherein said circuit comprises a fourth branch connecting an electrical connection terminal of the semiconductor current cutoff device to said first three branches of said circuit, this fourth branch comprising another mechanical switch.

10. The device according claim 1, further comprising two electrical connection terminals, one of which is intended to be connected to a DC current source.

* * * * *